MAGNETIC MEMORY

Filed Feb. 20, 1961 7 Sheets-Sheet 1

INVENTORS
OLEG AVSAN
GÖTE BÄCK
KURT ALVAR OLSSON
ÅKE BERTIL FREDRIK SVENSSON
BY Hane and Nydick
ATTORNEYS INVENTORS
OLEG AVSAN
GÖTE BÄCK
KURT ALVAR OLSSON
ÅKE BERTIL FREDRIK SVENSSON
BY Hane and Nydick
ATTORNEYS INVENTORS
OLEG AVSAN
GÖTE BÄCK
KURT ALVAR OLSSON
ÅKE BERTIL FREDRIK SVENSSON
BY Hane and Nydick
ATTORNEYS

MAGNETIC MEMORY

Filed Feb. 20, 1961 7 Sheets-Sheet 4

INVENTORS
OLEG AVSAN
GÖTE BÄCK
KURT ALVAR OLSSON
ÅKE BERTIL FREDRIK SVENSSON
BY Kane and Nydick
ATTORNEYS INVENTORS
OLEG AVSAN
GÖTE BÄCK
KURT ALVAR OLSSON
ÅKE BERTIL FREDRIK SVENSSON
BY Hane and Nydick
ATTORNEYS Jan. 25, 1966 O. AVSAN ET AL 3,231,872

MAGNETIC MEMORY

Filed Feb. 20, 1961 7 Sheets-Sheet 6

INVENTORS
OLEG AVSAN
GÖTE BÄCK
KURT ALVAR OLSSON
ÅKE BERTIL FREDRIK SVENSSON
BY Hane and Nydick
ATTORNEYS

MAGNETIC MEMORY

Filed Feb. 20, 1961 7 Sheets-Sheet 7

INVENTORS
OLEG AVSAN
GÖTE BÄCK
KURT ALVAR OLSSON
ÅKE BERTIL FREDRIK SVENSSON
BY Hane and Nydick
ATTORNEYS 3,231,872

MAGNETIC MEMORY

Oleg Avsan, Huddinge, Göte Bäck, Bandhagen, Kurt Alvar Olsson, Tullinge, and Åke Bertil Fredrik Svensson, Hagersten, Sweden, assignors to Telefonaktiebolaget L M Ericsson, Stockholm, Sweden, a corporation of Sweden Filed Feb. 20, 1961, Ser. No. 90,249

Claims priority, application Sweden, Dec. 20, 1960, 12,307/60

11 Claims. (Cl. 340—174)

The present invention refers to a magnetic memory, particularly for use in electronic telephone systems operating according to the time division multiplex principle, for storing coded records which by means of pulses are read out periodically in a definite pulse- or time position in order to close, depending on the record read out, the contacts of those means (subscribers, registers), between which a connection has to be set up in said pulse position. Such a magnetic memory or contact memory generally comprises magnetic cores arranged in the form of a matrix in lines and columns which cores may occupy two opposite magnetization conditions, a resting condition or 0-condition and a working condition or 1-condition, and they can by means of pulses be switched from one of said conditions to the other, in such a manner that by feeding read out pulses to lines belonging to different pulse positions, pulses will be obtained on sense wires which are extending through the magnetic field of such cores which are switched by means of the read pulses fed to the lines.

Writing and erasing of the records in the contact memory can be carried out by means of a marker which marks the cores in which changes of the condition shall be carried out and the reading out can be carried out by means of a pulse distributor which in turn connects a read out pulse to the matrix lines in order to enable the pulses obtained from the sense wires in the form of a code to cause a closing of the contact defined by said code. After each reading out of a code a rewriting has to be carried out in order to enable the magnetic memory to give the same answer for each new reading out until the marker has changed the record. Furthermore, the marker has to read out the contact memory without changing records already found there. Said functions necessitate expensive and complicated sensing circuits and the purpose of the present invention is to enable the writing and the reading out by means of simple and unexpensive means.

The contact memory according to the invention is substantially characterized by the fact that it comprises a memory part comprising in each column memory cores, the number of which corresponds in each column to the number of pulse positions which memory cores after each switching from working condition to resting condition are unconditionally reswitched whereby a sensing circuit belonging to each column, upon obtaining a sense pulse through the sense wire belonging to the respective column, immediately connects a rewriting current to a rewriting wire belonging to said column, and that a switching part comprising in each column at least one write core which upon obtaining a write pulse from the marker in a pulse position selected by the latter, affects the sensing circuit belonging to the respective column so that a writing into the memory core belonging to said pulse position is carried out through the rewriting wire in the same manner as if this would be caused by a record in the memory core, and at least a sense core which can be magnetized by a current passing through the rewriting wire and which upon obtaining a marking pulse from the marker is brought to a premagnetized condition such that it by means of a rewriting pulse can be brought to working condition, so that a read out pulse coming from the marker will switch the core back to its resting condition and as a result will produce a pulse which can be read out by the marker in the respective pulse position.

FIG. 1*a* is a basic block diagram showing two groups of subscribers in a telephone system in which each subscriber can be connected to a subscriber in the same group and to a subscriber in another group.

FIG. 1*b* is a diagram showing the pulse position in which connection can be established between the respective subscribers.

FIGS. 5*a*–5*e* show magnetizing curves for memory cores, write cores, sense cores, erasing cores and compensating cores, respectively, used in the contact memory.

Figure 6:
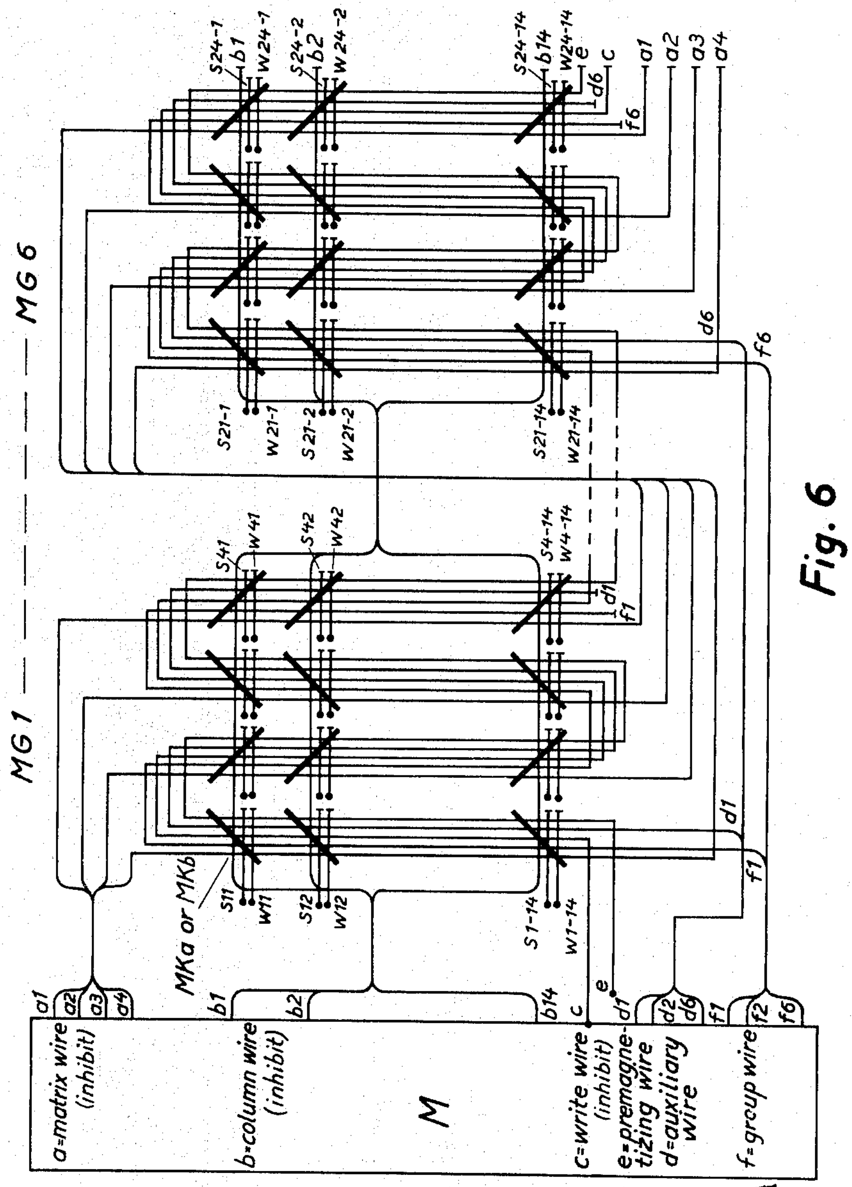

FIG. 6 shows the wiring of write cores and the sense cores, respectively.

Figure 7:
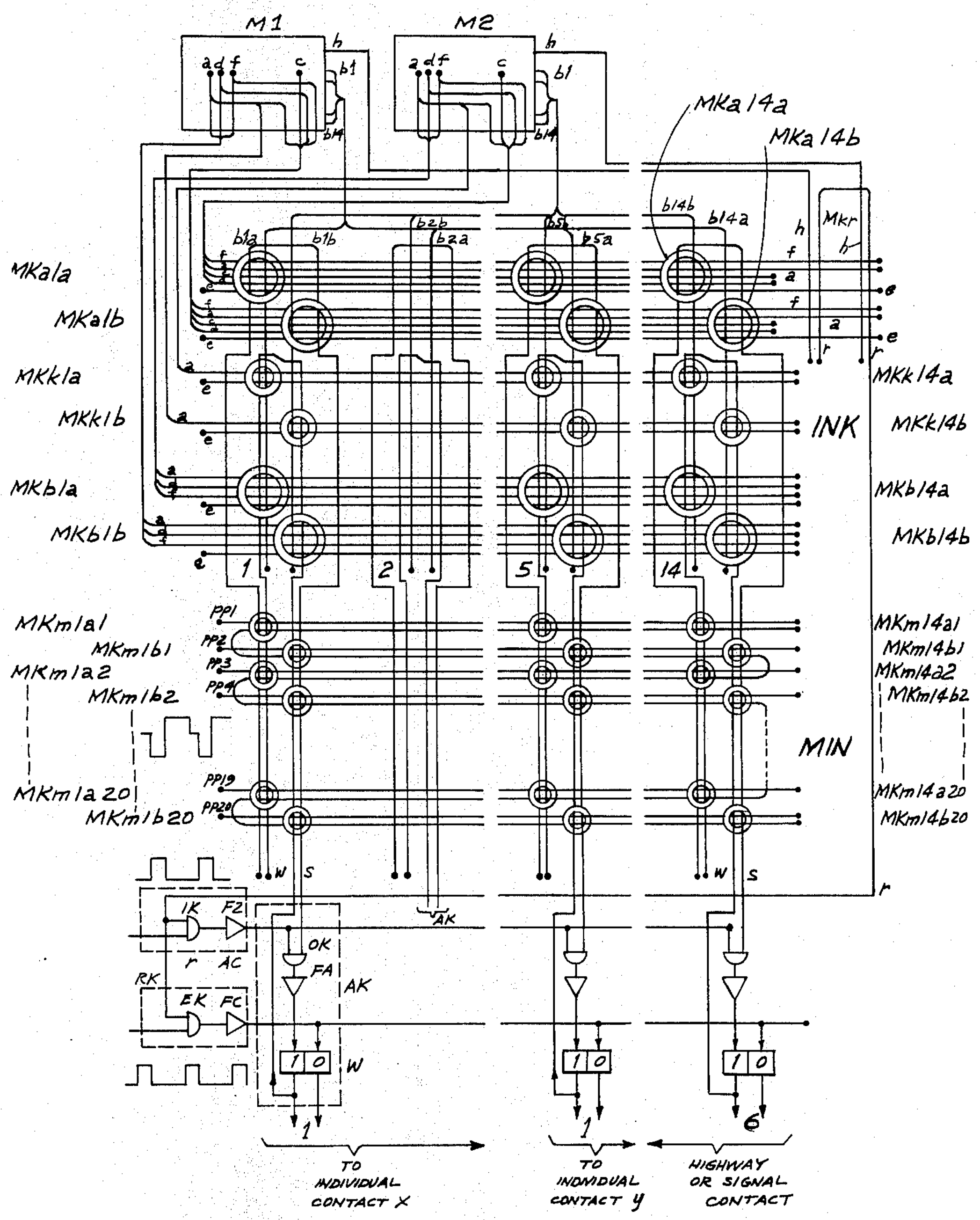

FIG. 7 shows a core matrix with the different types of cores in each column and the wires extending from the markers through the respective cores.

FIGS. 8*a*–8*p* are diagrams showing the changing of the magnetization condition of different core types in a definite pulse position and in subsequent cycles, and also showing the time process of the definite pulses in said pulse position.

Figure 1A:
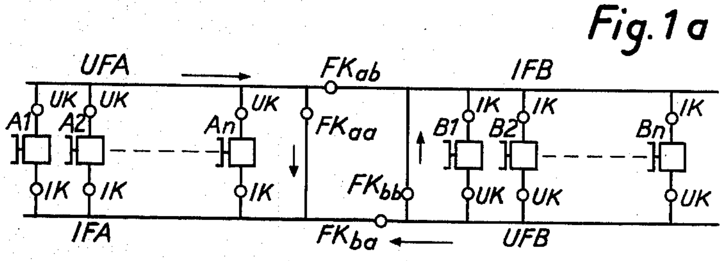
Figure 1B:
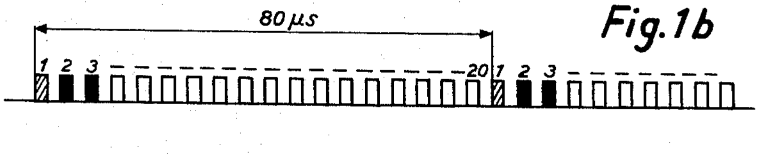

FIG. 1 shows a group of subscribers A*l*–A*n* and B*l*–B*n* respectively. The subscribers of the first group can each be connected through its outgoing speech contact or individual contact UK to a common outgoing conductor or highway UFA and through its incoming speech contact or individual contact IK to a common incoming highway IFA. In the same way the subscribers in the other group can be connected to an incoming highway IFB and to an outgoing highway UFB. The two highways belonging to a definite group of subscribers are in the following called a highway pair. The outgoing highway in each highway pair can through highway contacts FK*aa*, FK*ab*, FK*bb*, FK*ba* be connected to the incoming highway of each other highway pair and to its own incoming highway. The closing of as well the individual contacts as the highway contacts is carried out by periodically repeated pulses in a pulse position selected for the conversation among, for example twenty pulse positions. If for example the duration of a pulse position is 4 μsec., a selected contact is closed each 80th μsec. as shown in FIG. 1*b*. In order to obtain a double-directed connection between two subscribers A1 and A2, belonging to the same group or highway pair, it is necessary to make use of two pulse positions, for example position 2 and 3 in FIG. 1*b*, as it is easy to understand, as the same two common conductors have to be used in both speech directions. The highway contact FK*aa* has to be closed, of course, in both of said pulse positions. If, on the other hand, two subscribers belonging to different highway pairs, for example A1 and B1, have to be connected with each other, as well the highway contact FK*ab* as the highway contact FK*ba* have to be closed together with the individual contacts IK and UK respectively of the respective subscribers, but in view of the fact that there are both an incoming highway and an outgoing highway at disposal for each of the subscribers, it will be sufficient to have one pulse position, for example the pulse position 1, in order to obtain a connection in both directions. The speech connection exists as long as the individual contacts and the highway contacts are operated in the respective pulse position.

Figure 2:
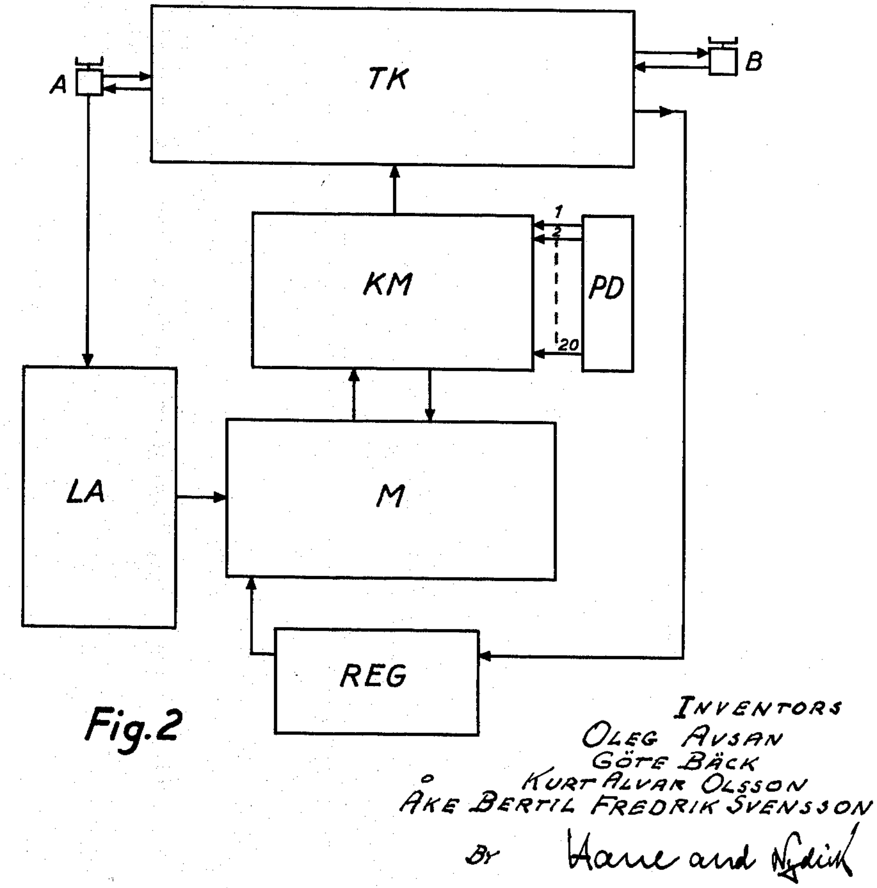
FIG. 2 shows a block diagram of an electronic telephone system comprising a switch contact network controlled by the contact memory.

FIG. 2 is a block diagram of an electronic telephone system, in which two arbitrary subscribers A and B can be connected with each other. A speech contact network TK comprises a number of individual contacts and highway contacts according to FIG. 1. The contacts are operated by means of periodical pulses which are obtained from a contact memory KM in the form of a code. The contact memory consists of a plurality of magnetic cores which when being brought from their resting condition to working condition by switching, will represent a record in code form. A pulse distributor PD is feeding read out pulses to the contact memory in said 20 pulse positions in turn, and this memory sends pulses to the speech contact network TK corresponding to the operated magnetic cores so that the contact corresponding to the code will be operated in the respective pulse position, as will be explained more in detail. The information regarding the contacts which have to be closed or the closing of which has to be terminated, is written and erased respectively by the marker M. The purpose of the marker is to determine by means of the line scanner LA the position of the subscribers in the multiple and their cradle contact condition and to select a common idle pulse position or common idle pulse positions for the calling subscriber and an idle register respectively to select a common idle pulse position or pulse positions for the calling and the called subscriber and to write the contact numbers in the contact memory KM in the respective pulse position. The register REG receives the digit selection signals by voice frequency signals in a manner known per se and transmits the received number to the marker M so that the marker by means of the line scanner LA determines whether the called subscriber is idle or not and carries out a corresponding writing in the contact memory. The line scanner LA, register REG and the marker M are not described in detail as their function has no importance for explaining the function of the contact memory.

Figure 3:
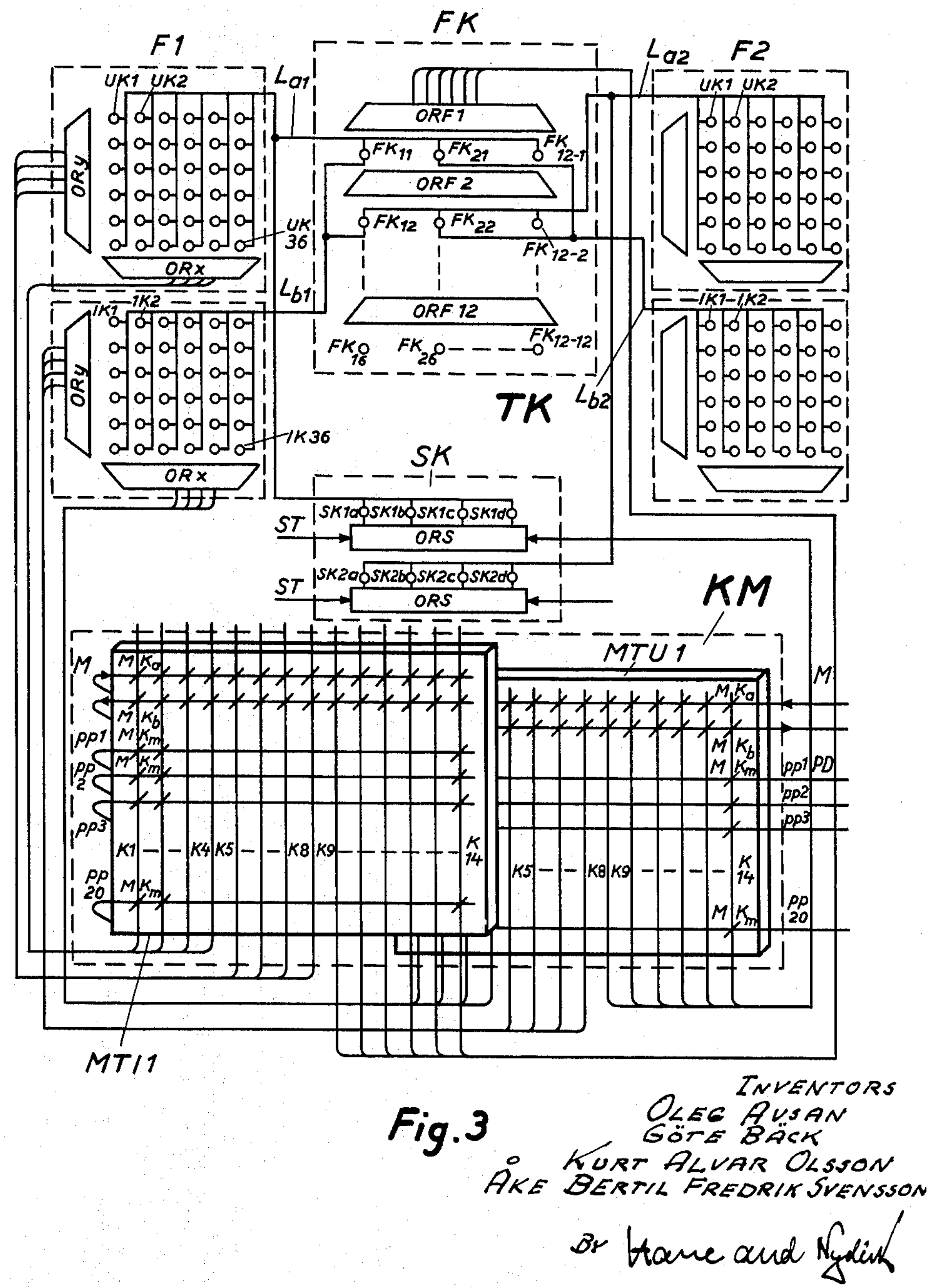
FIG. 3 shows diagrammatically a switch contact network and a contact memory in cooperation.

FIG. 3 shows the contact memory KM and its cooperation with the contacts in the contact network TK. For the sake of simplicity only those contacts are shown which belong to two highway pairs F1 and F2, though according to the embodiment it is supposed that the telephone exchange comprises 12 pairs of highway. According to the example 36 subscribers can be connected through individual contacts UK1, UK2 and so on to a common outgoing conductor or highway $L_{a1}$ and the same 36 subscribers can be connected through individual contacts IK1, IK2 and so on to a common incoming highway $L_{b1}$. In the same way the subscribers in the second highway pair can be connected to the highway $L_{a2}$ and $L_{b2}$ respectively. The highway contacts FK have the purpose to connect an arbitrary, incoming highway with an arbitrary outgoing highway. In the drawing only the highway contacts $FK_{11}$, $FK_{12}$, $FK_{21}$ and $FK_{22}$ are shown for the sake of clarity. By SK are designated signal contacts of which a number, for example four SK1*a*, SK1*b*, SK1*c*, SK1*d*, SK2*a*, SK2*b*, SK2*c*, SK2*d* and so on, belong to each of the outgoing highways $L_{a1}$, $L_{a2}$ and so on, so that by operating one of said contacts the signal type required is fed to the selected outgoing highway.

The contact memory is represented in the drawing by two perspectively shown matrixes, one matrix MTI1 for the incoming highway of the first incoming highway pair and one matrix MTU1 for the outgoing highway of the first highway pair. When having 12 highway pairs as supposed according to the example there are 12 matrixes of both types, but for the sake of simplicity only the matrixes belonging to the first highway pair are shown. The matrixes are only shown diagrammatically in order to explain their function in principle and they will be described later more in detail. The matrixes of the outgoing and of the incoming highway differ in a certain degree. According to the embodiment, in both there are fourteen columns of magnetic cores arranged in lines, of which twenty, *pp*1–*pp*20 correspond to the twenty pulse positions and they comprise memory cores MK*m*, one line comprises write cores MK*a* in order to enable the marker M to write a record in the respective column in a pulse position required and one line comprises sense cores MK*b* in order to enable the marker to read out the records recorded in the columns in said pulse position. The first eight columns in both matrix types have the purpose to indicate in code form the number of the individual contact UK which can be connected to the common outgoing highway respectively the number of the individual contact IK which can be connected to the common incoming highway. In the telephone system according to the embodiment there is no difference whether the individual contacts belong to a subscriber or to a register. The cores in the lines *pp*1–*pp*20 corresponding to the pulse positions are brought from 0-magnetization condition to 1-magnetization condition as will be explained later so that in a line belonging to the selected pulse position the cores represent in a 2 of 4 code one *x*-coordinate in the columns 1–4 and one *y*-coordinate in the columns 5–8. The coordinates define the individual contact intended. When a read out pulse is sent to the cores which are in 1-condition, through the read out wire *pp*1–*pp*20 belonging to the respective pulse position, said cores are switched, so that the written record is obtained in the form of pulses through the sense wires belonging to the columns. Two translators OR*z* and OR*y* belong to each of the highways and the information regarding the *x*- and *y*-coordinate and obtained in pulses in the form of 2 of 4 code is transmitted to said translators. The information is translated there to 1 of 6 code, so that the contact selected will be marked among the 36 contacts as well in the outgoing as in the incoming highway as a consequence that the respective horizontal line is scanned. The columns 9–14 in the matrix MT1 and in the matrix MTU have different purposes. In the matrix MT1 said columns define in 2 of 6 code the number of the highway contact FK through which the incoming highway of one subscriber will be connected to the outgoing highway of the other subscriber. The pulses representing said code are transmitted to a translator ORF in which they are translated to a 1 of 15 code. Hereby one of the twelve highway contacts is actuated, three numbers being maintained as a reserve. In the matrix MTU the columns 9–14 are used to indicate the category of the signalling, for example in 2 of 5 code, one column being maintained as a reserve. A translator ORS translates the code to 1 of 10 code for operating one of the signal contacts SK corresponding to the selected signalling type, the number of which contacts is four according to the example, and which contacts upon their closing feed a definite signal to the outgoing highway. By means of the arrow ST is symbolically shown that the operation of the signal contact can be made dependent on the time, for example in such a manner that the signal is changed after a certain time has elapsed from the beginning of the signalling. This has however nothing to do with the object of the invention and will not be described hereinafter.

Figure 4:
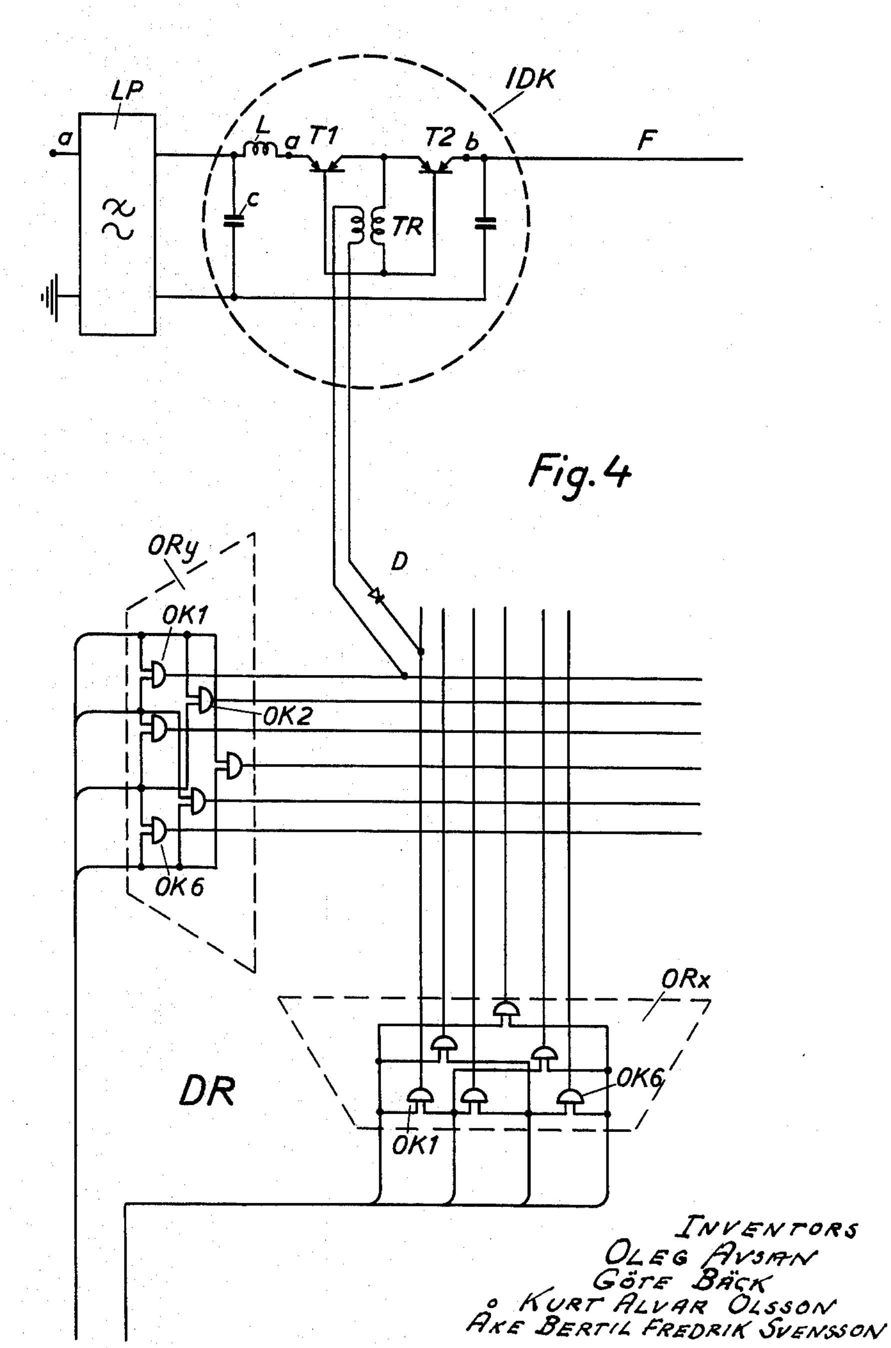
FIG. 4 shows a switch contact and its cooperation with a code translator.

FIG. 4 shows an individual contact IDK and a driving means DR comprising translators OR*x* and OR*y* and intended to close in each pulse position one of the 36 individual contacts. One speech wire *a* of the subscriber is through a low pass filter LP and an inductance L connected to an individual contact IDK. The other speech wire is in the same manner connected to another similar speech contact which is not shown in the drawing for the sake of clarity. A shunting capacitor C forming the last member of the low pass filter forms together with the inductance L an oscillating circuit, connection between two subscribers being obtained in such a manner that the charges stored in the capacitors of the respective subscribers change places with each other during the time their individual contacts IDK establish a connection through a common conductor F in a way known per se. The individual contact consists of an electronic switch having two transistors T1 and T2, the emitter-collector circuits of which are connected in series between the points *a* and *b* in the transmission circuit. The controlling circuit is connected between the parallelly connected emitters and the parallelly connected bases. When obtaining a pulse through the pulse transformer TR the transistors will be deblocked and a current can pass between the points *a–b*. The translating circuits OR*x* and OR*y* are represented by 6 and-circuits OK1, OK2 and so on, each having four inputs and six outputs, so that a pulse code fed to OR*x* and OR*y* respectively defines one of the 36 crossing points which in a definite pulse position obtain from the driving means DR a driving pulse for the individual contact.

As mentioned before, there are altogether twelve highway pairs. The matrixes are grouped in such a way that the matrixes of two highway pairs form a matrix group, thus there are altogether six matrix groups. As has been mentioned before in connection with FIG. 3 there belong to each column a write core MK*a* and a sense core MK*b*. The first mentioned core enables the marker to write a record in a definite column in a definite pulse position, and the latter enables the marker to read out a record belonging to a certain pulse position without changing said record. These two core types are part of the switching part or active part of the matrix which attends to the co-operation with the marker, compared with the memory part or the passive part, comprising the memory cores. The records of the memory cores the transmitted in each pulse position to the contact network in order to close the contact intended and the records are rewritten after each reading out until the marker erases the records in the respective pulse position as will be explained later.

FIG. 7 shows a matrix for a contact memory MT having fourteen columns and twenty-three rows of magnetic cores. The upper three lines form the switching part INK and the other lines form the memory part MIN. In the switching part only the columns 1, 5 and 9 and in the memory part only the columns 1, 4, 5, 8, 9 and 14 are shown for the sake of clarity. The drawing is valid for a matrix belonging to an outgoing highway and for a matrix belonging to an incoming highway. Through the memory cores belonging to the same column extend a sense wire *a* and a rewriting wire *w*. The last-mentioned wire suitably can have 3 turns in order to produce a suitable magnetization although in FIG. 7 only one wire is shown for the sake of clarity. Through each line of the memory cores MK*m* extends a read out wire *pp*, through which a read out pulse is obtained during the first part of the pulse position belonging to the wire while a write pulse is obtained during the second part. Furthermore a premagnetizing wire *e* extends through each of said lines, by which wires the cores are continuously premagnetized by direct current. The relative value and direction of the currents will be discussed in connection with the description of the magnetizing curves. When supposing that in a definite line there are records in the magnetic cores, then upon feeding a read out pulse to the read out wire *pp* of the line a pulse will be obtained through the sense wires *s* which extend through the memory cores having 1-condition. To each column belongs a sensing circuit AK comprising an and-circuit OK, an amplifier FA and a bistable switch W. The pulse obtained through the sense wire *s* is conducted to the bistable switch which is represented by a logic symbol and which in its 1-condition sends a pulse to the contact network. There is however a further condition necessary in order to render the and-circuit OK conducting in each of the sensing circuits and this condition will be satisfied by the function of the activating circuit AC. The activating circuit comprises an inhibit circuit IK and an amplifier F2 and its purpose is to activate the sensing circuit only during the first part of the pulse position. No current can pass to the switch W in any of the sensing circuits when the activating circuit does not work. The activating circuit is fed by periodical activating pulses, the time position of which within the pulse period appears from FIG. 8. The function of the activating circuit is also depending upon an inhibiting condition which is satisfied when the recordings in the memory cores are erased by means of an erasing core MK*r*, the function of which also appears from FIG. 8. FIG. 7 shows a restoring circuit RK which comprises an or-circuit EK and an amplifier F3. The purpose of the restoring circuit is to restore by means of a restoring pulse (FIG. 8), the switch of the sensing circuit to 0-condition at the end of each pulse period. The or-circuit enables the pulse which causes the inhibiting condition for the activating circuit, to restore the switch to 0-position already in the beginning of the pulse period. The function of the activating circuit AC, restoring circuit RK and erasing core MK*r* will appear from FIG. 8.

The switching part INK which attends to the co-operation of the matrix with the marker or the markers comprises a line of write cores MK*a*, a line of sense cores MK*b* and furthermore a line of compensating cores MK*k*. For the sake of simplicity only the columns 1, 5 and 9 are shown in the switching part. The matrix co-operates according to the example with two markers M1 and M2 and correspondingly there are two of each type of cores in the switching part in each column. The marker operates the magnetic cores in the switching part through a number of wires, the total magnetization of which brings the cores to 1-condition respectively to 0-condition. This will be clear with reference to FIGS. *5a–5e* and FIG. 6, and at this point it need to be only mentioned that through write cores MK*a* extend 4 "horizontal," i.e. line wires *a*, *c*, *d*, *f* from the marker, with which the core co-operates, through the sense cores MK*b* extend 3 horizontal wires *a*, *d*, *f* and through the compensating core extends one horizontal wire *a*. Furthermore a vertical wire or column wire *b* extends through all the three types of cores in the respective columns. A further vertical wire, the rewriting wire *w* which extends through the memory cores, extends through the sense core and the compensating core in the respective column, and the sense wire *s* which extends through the memory cores, extends also through the write core and through the compensating core in the respective column. Furthermore through all the three types of cores extend horizontal direct current premagnetizing wires *e*. Through the erasing cores MK*r* of which according to the example there is only one for each matrix, extend the horizontal wires *f* and *a* extending also through the write cores, and the direct current premagnetizing wires *e*. Furthermore there is a vertical wire *h* for conducting an erasing pulse from the marker to the erasing core and a sensing wire *r*, through which a core pulse is conducted from the erasing core to the activating circuit AC and to the restoring circuit RK respectively as will be clear from the following. It is however also possible to arrange an erasing core for each column in order to allow to change the record in each column separately as also will be explained later. Prior to a more detailed description of the magnetization process of the cores, it may be mentioned that the matrix according to FIG. 7 works in such a manner that the write cores MK*a* are brought by the marker from resting condition to working condition corresponding to a code, whereby the memory core MK in the respective column and in the respective pulse position obtains a rewriting pulse through the sensing circuit and is switched so that it will contain a record. When a read out pulse is obtained through the read out wire *pp* belonging to the respective line, the memory is switched and a read out pulse is obtained through the *s*-wire and the switch is set to 1-condition so that a pulse is obtained on the output of the switch belonging to the column. Simultaneously a rewriting pulse is sent from the switch through the rewriting wire *w* to the column so that the record is unconditionally rewritten into the memory core. When the record in all the cores has to be erased in a pulse position this is carried out, according to the example, by means of the erasing core which is common for the whole matrix and which influences the inhibit-circuit of the activating circuit AC so that the latter is blocked. The switch W cannot be set to 1 and the rewriting ceases whereby the record in the respective core disappears as a consequence of the fact that the rewriting has ceased. If there is an erasing core for each column, the direction of the magnetizing current which is produced by the erasing core on the *s*-wire will be opposite to the direction obtained by switching the memory core, and the rewriting ceases. If the marker is to be informed whether there is a record in the memory core, the sense core MK*b* is magnetized in the respective column and in the respective pulse position whereby the sense core can be brought to 1-condition when rewriting is carried out simultaneously in the respective pulse position, that is, a record is found in the memory core. When the sense core MK*b* is switched, a pulse is obtained through the column wire *b* belonging to the column which will function as a sense wire for the marker M. If there should be no record in the column in the respective pulse position, the sense core cannot be brought to 1-condition and consequently it cannot produce a pulse. The compensating core MK*k* is intended for eliminating disturbances from the rewriting wires *w* through the sense core MK*b*. The function of the different cores mentioned shortly hereabove will be made clear more in detail in connection with the magnetization curves.

Figure 5A:
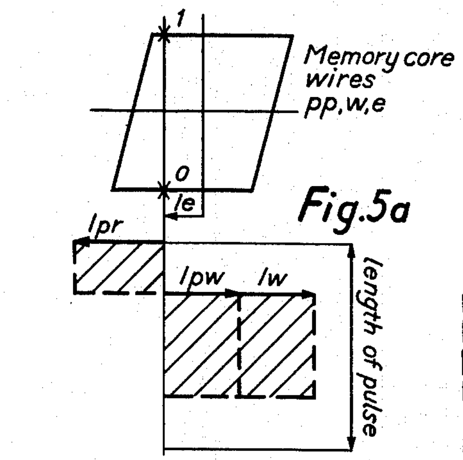

FIG. 5*a* shows the magnetization diagram of a memory core. Due to the direct current magnetization, the magnetization points are displaced in 0-direction. Through the *pp*-wire which extends through the core, two pulses are obtained after each other within a pulse position, at first a read out pulse and after this a write pulse as seen from FIGS. 8*k* and 8*m*. The read out pulse is 0-setting and the write pulse is 1-setting. The current I*pw* of the write pulse can however not bring the core to 1-condition. If however it is supposed that the core has already been in 1-condition when it obtained the read out pulse, the core will be switched to 0-condition and a core pulse will be obtained on the *s*-wire (FIG. 7). The sense circuit AK in the respective column is operated, the switch W will be 1-set and a rewriting pulse will be obtained through the *w*-wire (or wires in the case the wires extend in several turns.) The current of the rewriting pulse I*w* has 1-setting direction and the sum of the rewriting current I*w* and of the write current I*pw* obtained through the *pp*-wire will be sufficient for bringing the core to 1-condition so that when the read out pulse is obtained in the next cycle in this pulse position, the core will be found in 1-condition. A 0-set memory core can be brought to 0-condition by means of a write core belonging to the column, and a 1-set core is brought to 0-condition by means of an erasing core. In FIGS. 5*a*–5*e* the positions of the read out and the write pulse are also shown within a pulse position.

Figure 5B:
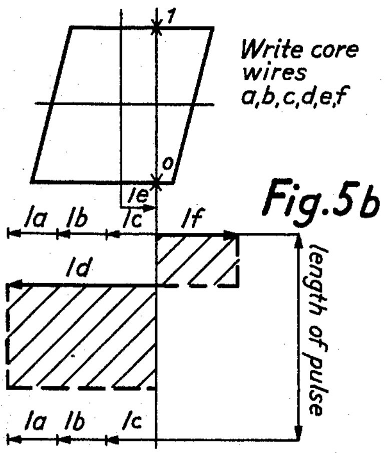

FIG. 5*b* shows the magnetization diagram of a write core. Due to the direct current premagnetization the coercive points are displaced in 1-direction. As already shown in FIG. 7, besides the premagnetizing wires *e* four line wires, *a, c, d* and *f* and two column wires or vertical wires *b* and *w* are extending through each write core MK*a*. FIG. 6 shows how the different magnetizing wires extend through the six matrix groups MG each consisting of four matrixes. The figure is valid for the write cores MK*a* and for the sense cores MK*b* and the only difference is that the wire *w* does not extend through the write cores and the wires *c* and *s* do not extend through the sense cores. As appears from FIG. 6 the wires *a* are individual for the four matrixes within a matrix group, but are common for the matrixes having the same number of order in all the matrix groups. The wires *b* are individual for the fourteen columns within a matrix but are common for the columns having the same number or order in all the matrixes. The wire *c* extends through all the write cores in the twenty-four matrixes. These three currents are 0-setting or inhibiting currents and they will pass as long as the core shall be unoperated. One *f*-wire and one *d*-wire belong to each of the matrix groups MG. The current which is obtained through the *f*-wire, is 1-setting and it has such a value that it can bring the core from 0-condition to 1-condition. The condition is however that the 0-setting currents I*a*, I*b* and I*c* have been inhibited and this requires that the write core having a definite column number and matrix number will be prepared for switching in each of the 6 matrix groups. When the pulse intended for one of the six matrix groups is connected to the wire *f* during the first part of the pulse position, only one of the six write cores can be switched which is situated in the marked matrix group, so that one of the $14\times4\times6=336$ write cores will be defined. Of the column wires *b* an arbitrary number can be marked in order to carry out the writing in all the columns of a matrix at the same time. As shown in FIG. 5*a* and FIG. 8*e*, cycle 2, the marker sends a write pulse to the write core at the beginning of the pulse position. This write pulse implies feeding of current through the *f*-wire as mentioned before, after the 0-setting currents I*a*, I*b* and I*c* have been inhibited. During the following part of the pulse position an auxiliary pulse is sent (the significance of this designation will be clearer when describing the sense core) from the marker through the *d*-wire, producing a 0-setting current for all the write cores in the memory group MG in question. This requires that all the write cores which have been in 1-condition, are restored to 0-condition. When 1-setting the write core a pulse is obtained through the *s*-wire which is a common sense wire for the memory cores MK and the write core MK*a* (FIG. 7) belonging to the same column. The pulse obtained as a consequence of the switching of the write core is obtained in the same position within the pulse position as when the read pulse through the wire *pp* switches the memory core which belongs to the pulse position and is in 1-condition. The sensing circuit AK belonging to the respective column works consequently in the same manner as if the pulse through the sense wire *a* of the column would be obtained as a consequence of a record in the memory core. Rewriting is consequently carried out in the same manner as described before, that is, the memory core is brought to 1-condition by the sum of the rewriting current I*w* and the write current I*pw* and the memory core is brought to 1-condition so that the sensing procedure and the rewriting procedure thereafter will be repeated cyclically in the respective pulse position quite independently of the write core. The write core after being restored to 0-condition by means of the auxiliary pulse sent from the marker through the wire *d* (FIG. 7) obtains again magnetization in 0-setting direction through the wires *a, b* and *c*.

Figure 5C:
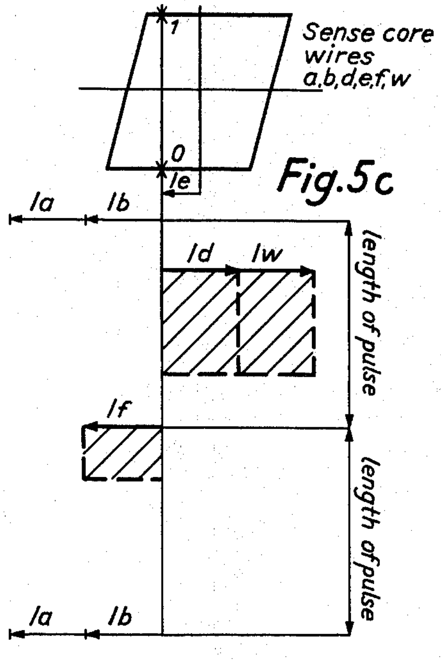
Figure 8:
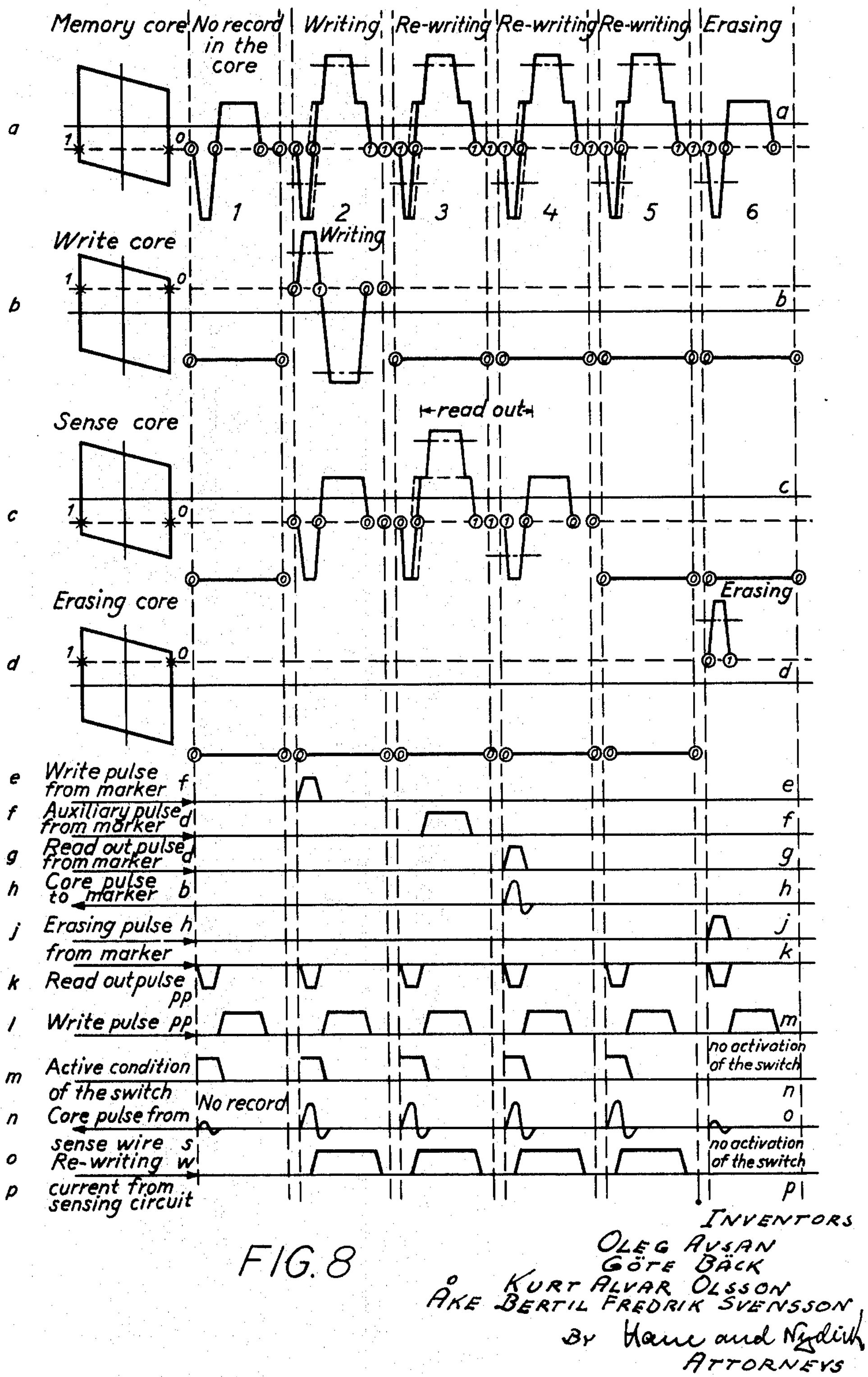

FIG. 5*c* shows a magnetization diagram of a sense core. Due to direct current magnetization the coercive points are displaced in 0-direction. FIG. 6 refers also to the position of the sense cores and of their magnetizing wires. The difference relatively to the write cores consists therein that the wire *c* which extends through all the write cores is not found in the sense cores. The rewriting wire *w* belonging to the column extends through the sense core belonging to the column. When the marker does not carry out a reading out, a current will pass through the wires *a, b* and *f* in 0-setting direction through the two first wires continuously and through the third during the write pulse (FIG. 8*e*) of the marker. The direction of the $f$-wire has been 1-setting for the write core, for the sense core the current will however be 0-setting through the $f$-wire. For the write core the current through the $d$-wire has been 0-setting, and it will be 1-setting for the sense core. The reason for said opposite current directions is that, as appears from the FIGURES 8$e$ and 8$k$, the pulse through the $f$-wire has to influence the write core in 1-setting direction during the first part of the pulse position so that there will be a coincidence of the time of this pulse and the time of the read out pulse coming through the wire $pp$ as is easy to see with reference to the above. The auxiliary pulse which is obtained through the $d$-wire and which influences the write core in 0-setting direction (FIG. 8$f$), has to be sent from the marker to the write core during the second part of the pulse position so that the write core should be restored to 0-condition when the pulse position is terminated. FIG. 8 shows the change of the condition of the different cores in the same pulse position during 6 subsequent cycles. The curves at the bottom of the figure show the process of the different pulses. FIG. 8$a$ shows the change of the condition of the memory core, FIG. 8$b$ of the write core, FIG. 8$c$ of the sense core and 8$d$ of the erasing core. FIGS. 8$e$, 8$f$ and 8$g$ show the process of the pulses sent from the marker to the magnetic memory, the first refers to the write pulse, the second to the auxiliary pulse which follows after the first mentioned pulse within the same pulse position and the third refers to the read out pulse which corresponds to the write pulse but which only in a 1-set sense core can carry out a reading out. FIG. 8$h$ shows the pulse which is sent from the magnetic memory to the marker when the read out pulse from the marker has found a record in the column belonging to the respective sense core, i.e. it has found a 1-set sense core. FIG. 8$j$ shows an erasing pulse, FIGS. 8$k$ and 8$m$ show pulses which are sent to the magnetic memory through the read out wire $pp$, the first mentioned pulse is the read out pulse and the second is the write pulse. As it appears the write pulse obtained from the marker coincides with the read out pulse obtained from the read out wire $pp$, and the auxiliary pulse obtained from the marker after the write pulse coincides with the write pulse obtained through the wire $pp$. FIG. 8$n$ shows the pulses obtained from the activating circuit AC, which bring the switches to active condition at the beginning of each pulse position, FIG. 8$o$ shows the pulses obtained through the sense wire $s$ and FIG 8$p$ shows the rewriting pulses obtained from the sense circuit through the rewriting wires $w$.

With reference to FIG. 8 will be clear as well the function of the sense core as the cause why the currents through the wires $d$ and $f$ have opposite directions in the write core and in the sense core. When first considering the memory core FIG. 8$a$, it appears that when there is no record in the core (cycle 1), the core is maintained in 0-position during the read out pulse I$pr$ obtained through the $pp$-wire (FIG. 5$a$, FIG. 8$a$ and FIG. 8$k$). During the write pulse I$pw$ which is obtained through the $pp$-wire (FIGS. 5$a$, 8$a$ and 8$m$), the memory core obtains a current in 1-setting direction but this current is not sufficient for bringing the memory core to 1-position so that the core will be again in 0-condition at the end of the pulse position. If now a write core MK$a$ is operated (cycle 2), this is carried out in such manner that it will be brought from 0-condition to 1-condition as has been explained in connection with FIG. 5$b$, by means of a write pulse through the wire $f$ (FIGS. 5$b$, 8$b$ and 8$e$). By said change of condition a pulse is obtained in this pulse position through the sense wire $s$ (FIG. 8$o$). The sensing circuit AK is operated and the write wire $w$ magnetizes the memory core MK in 1-setting direction I$w$ at the same time as the write pulse I$pw$, also in 1-setting direction, is obtained through the $pp$-wire. The result in respect to cycle 1 will be that the memory core is brought to 1-condition and it will be retained there also after the end of the pulse position. Hence, when the read out pulse is obtained through the $pp$-wire during the next cycle, this read out pulse can switch the core from 1-condition to 0-condition and can produce a pulse through the $s$-wire (cycle 3). Thus as seen by the sensing circuit AK there is no difference whether the pulse through the $s$-wire has been obtained as a consequence of the fact that the write core has been switched from 0-condition to 1-condition by the write pulse from the marker, or that there is already a record in the memory core and the latter has been switched from 1-condition to 0-condition by the read out pulse through the $pp$-wire. Consequently the sensing circuit will open the switch already during cycle 2 and will feed a rewriting current through the $w$-wire. In FIG. 8$a$ there is shown by dashed lines that said rewriting current begins already before the write pulse from the marker ceases. The auxiliary pulse which follows after the write pulse from the marker through the $d$-wire, restores the write core to 0-position.

When now considering the magnetization process of the sense core in FIG. 5$c$ respectively 8$c$ it appears that when a read out pulse is sent from the marker to the sense core and there is no record in the column (cycle 2), the auxiliary current through the $d$-wire cannot bring the sense core to 1-condition. If there is a record in the memory core belonging to the column, this specifies (cycle 3) that a magnetization current is obtained through the wire $w$ during the write pulse of the $pp$-wire which current coincides with the auxiliary pulse from the marker so that the combined effect of the rewriting pulse and the auxiliary pulse switches the sense core whereby the latter is in 1-condition at the end of the pulse position. When the read out pulse is obtained through the $f$-wire from the marker during the first part of the pulse position during the next cycle (cycle 4), said pulse can switch the read out core from 1-condition to 0-condition whereby a pulse is sent through the $b$-wire to the marker to indicate that there is a record in the column. As it appears this pulse has the same position within the pulse position as the write pulse coming from the marker. The currents through the wires $d$ and $f$ are oppositely directed in the write cores and in the sense cores due to the fact that the sense core has to be brought first to 1-condition in order to allow reading out and the sense core can be brought to 1-condition only when a rewriting is carried out in the memory core through the wire $w$, that is during the write pulse of the $pp$-wire. The reading out is carried out during the next cycle when the read out pulse through the $f$-wire switches the sense core. Hence, the difference between the function of the write core and the sense core resides in the fact that the write core is brought from 0-condition to 1-condition during the first part of the pulse position and is restored from 1-condition to 0-condition during the second part of the same pulse position while the sense core is brought from 0-condition to 1-condition during the second part of a pulse position and is brought from 1-condition to 0-condition during the first part of this pulse position during the following cycle. In FIG. 8$c$ the change of the magnetization condition during the cycle 4 is shown when the read out signal is sent to the marker and the condition afterwards. During cycle 5 the condition is shown in which the write core and the sense core are inactive, that is, they are magnetized by the 0-setting currents through the wires $a$, $b$, $c$ and through the wires $a$, $b$ respectively. In this cycle the record is still remaining in the memory core and it is read out during the first part of the pulse position by means of the read out pulse obtained through the wire $pp$ and it is rewritten during the second part of the pulse position by means of the write current obtained through the wire $pp$ and the rewriting current obtained through the wire $w$.

Figure 5D:
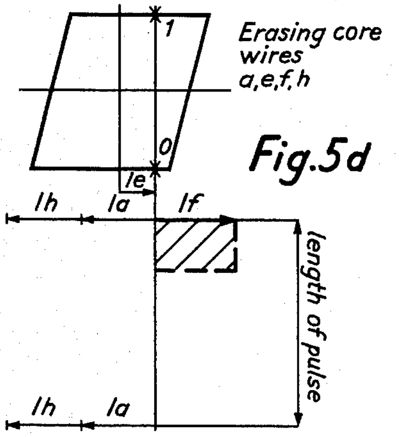

As mentioned before, according to the example the erasing of all the records in a pulse position is carried out by means of an erasing core MK*r* common for the whole matrix. FIG. 5*d* shows a magnetization diagram of the erasing core. Due to direct current magnetization the coercive points are displaced in 1-setting direction. Through the wires *a* and *b* (FIG. 7) the erasing core obtains 0-setting current. Both said currents have to be inhibited for enabling the pulse obtained through the wire *f* during the first part of the pulse position, to bring the core to 1-position and hereby to produce a pulse through the *r*-wire. This pulse will inhibit the function of the activating circuit AK so that the rewriting ceases, as earlier explained in connection with FIG. 7. When the 0-setting currents are connected through the wires *a* and *h,* the erasing core is restored to 0-condition and it is ready for the next erasing operation. The change in the condition of the erasing core is shown during cycle 6 in FIG. 8*d* and its function is further elucidated by means of the diagrams 8*j,* 8*n* and 8*o*. In the diagram 8*n,* there is shown the process of the pulses which are fed to the sensing circuits AK in order to activate the same during the first part of the pulse position. In the cycle 6 there is no such activating pulse due to the pulse obtained from the erasing core. The diagram 8*o* shows that in consequence of the inhibiting no such read out pulse will be fed to the switch in the sensing circuit in the same way as it was fed during the cycle 1 in which there has been no record in the memory core. The diagram 8*p* shows that in consequence of the inhibiting of the sense pulse there is not either any rewriting pulse on the wire *w,* in the same way as during cycle 1 in which there has been no record in the memory core. As mentioned before it is possible to arrange an erasing core for each column in order to allow change of the record in each column separately. In this case the erasing core functions in the same way as the write core but the magnetizing current which is obtained through the *s*-wire in consequence of the core pulse from this erasing core, will be opposite to the current which is produced by switching of the memory core so that no sense pulse will be obtained through the *s*-wire and the rewriting will cease without necessitating any inhibition of an activating circuit.

Figure 5E:
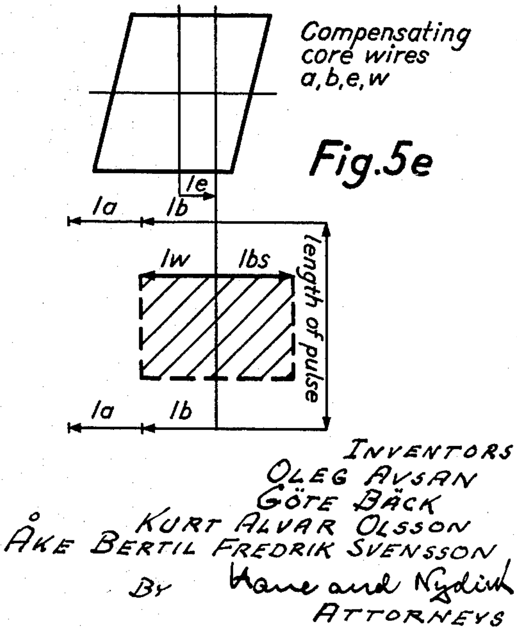

FIG. 5*e* shows a magnetization diagram of the compensating cores MK*k* in FIG. 7. The purpose of the compensating core is to eliminate disturbances which arise in the column wires *b* from the part of the rewriting wires *w* in the sense core MK*b*, by causing a coupling between the rewriting wire *w* and the column number wire *b* equal but oppositely directed to the coupling arising in the sense core. This is necessary in order to prevent the disturbances on the column number wire when the latter is used as sensing wire, to be too great as many sensing circuits having the same column number are working in the same pulse position. The disturbances are cumulative in such a manner that they may produce an erroneous read out for the marker. In consequence of the fact that in the compensating core MK*k* the wires *b* and *w* are directed oppositely relative to the direction in the sense core, the disturbances will be eliminated. From FIG. 5*e* appears that the currents through the wires *a* and *b* have the same direction and effect as in the sense cores, while the current I*w* through the wire *w* is 0-setting at the same time as the current I*bs* through the column wire *b* used as read out wire is 1-setting so that a compensation occurs.

We claim:

1. A memory system comprising: a matrix of magnetic cores that are switchable between a 1-state and a 0-state, the cores of said matrix being arranged in a plurality of rows and columns, one of said rows being a write row, another of said rows being a sense row, and the remainder of said rows being storage rows; each of said storage rows having at least a row-selection winding inductively coupled to the magnetic cores of the row; means for selectively energizing each of said storage-row windings, each of the columns of the storage-row portion of the matrix having a sense winding inductively coupled to the cores of the row and also having a rewrite winding inductively coupled to the cores of the row, and circuit means for connecting the sense winding to its associated rewrite winding so that information when sensed in any core of the column can be rewritten; a write-control winding means inductively coupled to each of the cores of the write-row for switching the cores between the states and an output winding inductively coupled to each of the cores of the write row and connected to the sense winding of the associated column of the storage-rows portion so that writing in a core of the storage-rows portion takes place via the associated circuit means and the rewrite winding of the column; means for selectively energizing said write-control winding means and operating in synchronism with said memory row winding energizing means; an input winding inductively coupled to each of the cores of the sense row and connected to the rewrite winding of the associated column and sense-control-winding means inductively coupled to each of the cores of the sense row for conditioning said core so that when the rewrite winding is energized the core changes to the 1-state, and an output winding inductively coupled to each of the cores of the sense row for indicating the sensing of information in a core in the associated column of the storage-rows portion of the matrix; and means for periodically energizing said sense-control-winding means.

2. The memory system of claim 1 wherein said means for selectively energizing each of said storage-row windings includes means for transmitting current signals which have a first polarity during a first portion of each current signal and an opposite polarity during a second portion of each current signal.

3. The memory system of claim 1 wherein the means for selectively energizing said write-control-winding means includes current-pulse-generating means which cause the cores in the write row to change to the 1-state and induce a signal pulse on the associated sense windings.

4. The memory system of claim 1 wherein said means for periodically energizing the sense-control-winding means includes means for generating current pulses in synchronism and phase with signals on said rewrite windings to cause the cores of the sense row to switch to the 1-state.

5. The memory system of claim 1 further comprising energized inhibit windings inductively coupled to sense-row cores and said write-row cores to force said cores to the 0-state and means for de-energizing said inhibit windings to permit said cores to be switched to the 1-state.

6. The memory system of claim 5 wherein selected combinations of the energized inhibit windings can be deenergized so that selected write-rows and read-rows cores are permitted to be switched to the 1-state.

7. The memory system according to claim 6 wherein at least one of said energized inhibit windings is controlled by a sense-row core in the 1-state.

8. The memory system of claim 1 wherein said matrix further comprises a row of compensation cores, the core in each column being coupled to the input and output windings of the sense-row core of the associated column, said windings having mutually opposing effects on the compensation cores.

9. The memory system of claim 1 wherein said circuit means includes a bistable storage element which is set to a 1-state by signals received from the associated sense winding and which, when in the 1-state, energizes the associated rewrite winding.

10. The memory system of claim 9 further comprising gating means interposed between each bistable storage element and the associated sense winding to controllably prevent signals on said sense winding from setting said bistable storage element to the 1-state, and erase control means for activating said gating means to prevent rewriting in the cores of at least one storage row.

11. The memory system of claim 1 further comprising erasing means for selectively applying signals to selected sense windings for counteracting signals generated by the associated cores of the storage rows to prevent rewriting in said associated cores.

References Cited by the Examiner

UNITED STATES PATENTS

| | | | |
|---|---|---|---|
| 2,956,271 | 10/1960 | Keller | 340—166 |
| 3,157,860 | 11/1964 | Batley | 340—174 |
| 3,172,087 | 3/1965 | Durgin | 340—174 |

IRVING L. SRAGOW, *Primary Examiner.*

JOHN F. BURNS, *Examiner.*

R. R. HUBBARD, S. M. URYNOWICZ, *Assistant Examiners.*